July 24, 1962  J. M. DIEHL ETAL  3,046,180
METHOD OF MAKING LAMINATES USING UNSATURATED POLYESTERS
Filed Aug. 12, 1955  2 Sheets-Sheet 1

INVENTORS
JOHN M. DIEHL AND
LUTHER L. YAEGER
BY
John L. Diehl
Attorney

July 24, 1962
J. M. DIEHL ET AL
3,046,180
METHOD OF MAKING LAMINATES USING UNSATURATED POLYESTERS
Filed Aug. 12, 1955
2 Sheets-Sheet 2
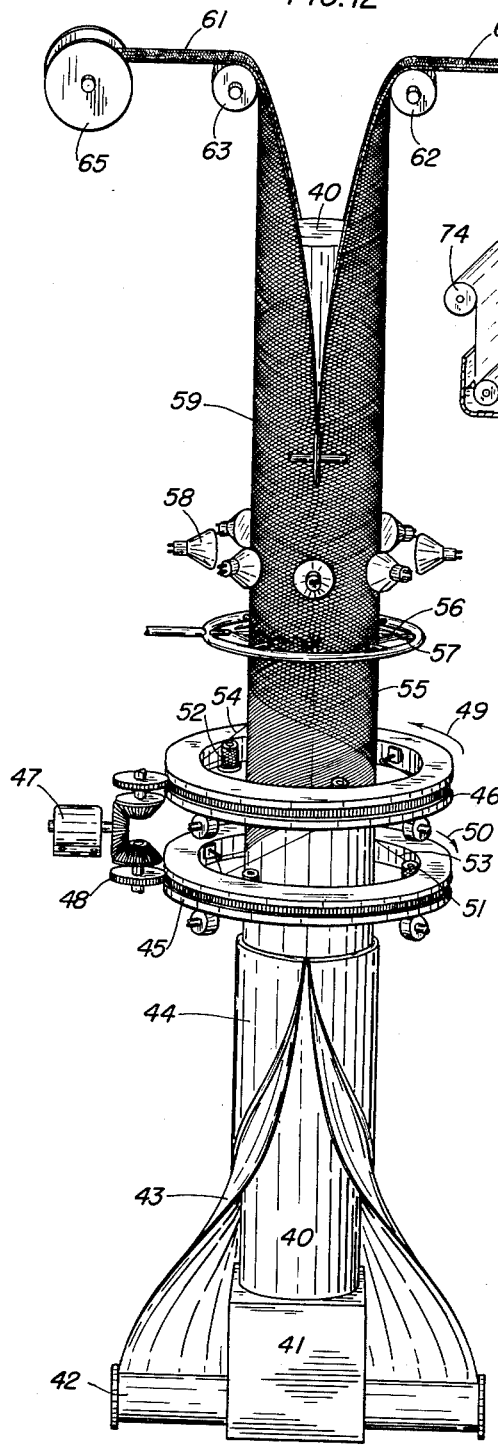
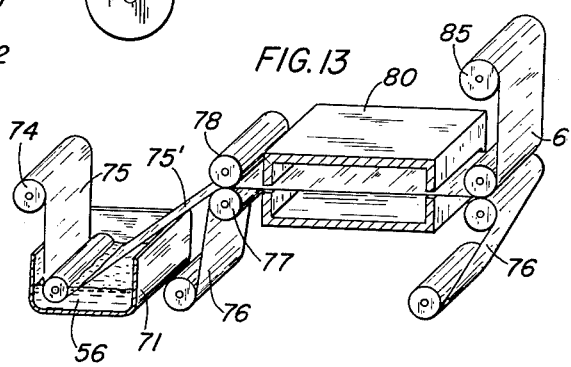
INVENTORS
JOHN M. DIEHL AND
LUTHER L. YAEGER
BY
Attorney 17# United States Patent Office 3,046,180
Patented July 24, 1962

3,046,180
METHOD OF MAKING LAMINATES USING UNSATURATED POLYESTERS
John M. Diehl and Luther L. Yaeger, Madison, Wis., assignors, by mesne assignments, to Tru-Scale, Inc.
Filed Aug. 12, 1955, Ser. No. 527,989
2 Claims. (Cl. 156—246)

This invention relates to a method of providing an adhesive bond to a polyester body and more particularly to a method for laminating together two sheets of reinforced unsaturated polyester resin to form a polyester article; the article may contain filling and reinforcing materials.

The subject matter of this patent may be used by or for the Government for governmental purposes without the payment of any royalties to us.

Graphic art and particularly cartographic base materials have been made of synthetic resin reinforced with glass fabric. The property of dimensional stability is most particularly desired in cartographic bases and in bases for photographic reproduction of master drawings of engineering plans, and cartographic base materials and other such materials have heretofore been unsatisfactory because of dimensional unstability when subjected to conditions of high humidity or of extremely high or low temperatures. Therefore a translucent sheet material (which may be almost transparent in appearance) which is unaffected dimensionally or is substantially unaffected by varying moisture conditions, including being soaked in water for 24 hours, and which is resistant to temperature change by reason of having a low thermal coefficient of expansion is high desirable.

Glass, because of its low thermal expansion coefficient and insignificant moisture absorption, is an ideal reinforcement for such a base made of synthetic resin which itself has substantially no moisture absorption.

Heretofore cartographic base materials have been produced by impregnating glass cloth with synthetic resin such as a polyester resin, but such materials have been undesirably affected by variations in temperature and further have the disadvantage that the themal expansion is different in the machine direction from that in the cross direction and extension in each direction has been excessive. It has been discovered that this is because of the crimp or waviness in the strands of yarn which permits elongation when under stress.

An object of the invention is therefore a method for adhering glass fiber reinforced polyester sheets or other polyester bodies together in such manner that no bonded surface can be located after bonding is accomplished.

Another object is to provide a translucent sheet material for reproduction purposes which has great dimensional stability under varying conditions of temperature and moisture.

Further objects will become apparent from the drawings and the following detailed description in which it is our intention to illustrate the applicability of the invention without thereby limiting its scope to less than that of all those equivalents which will be apparent to one skilled in the art. In the drawings, like reference numerals refer to like parts and:

FIGURE 12 is a perspective view of apparatus for carrying out the process of FIGURES 6–11 on a continuous basis;

FIGURE 13 is a schematic perspective view of apparatus for continuously making the sheets of FIGURES 1 and 2.

Figure 1:
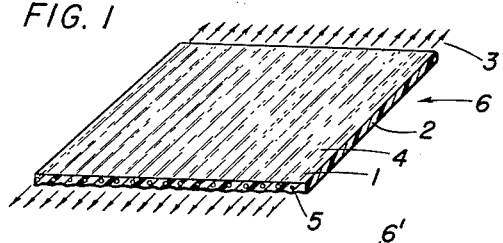
FIGURE 1 is a perspective view of a sheet of unsaturated polyester synthetic resin reinforced with a plurality of straight parallel glass strands.

The surfaces of the unsaturated polyester sheets reinforced with glass strands are generally objectionably rough. This defect may be obviated or eliminated by the following two step process:

STEP 1

A glass reinforced unsaturated polyester laminate is prepared in the usual manner of copending application Serial No. 317,072, filed October 27, 1952, now abandoned, with the exception that one surface, instead of being covered with cellophane or with the surface of a mold, is allowed to be exposed to the air during the curing of the unsaturated polyester resin.

STEP 2

Liquid unpolymerized unsaturated polyester resin is applied to the said one surface by dipping, brushing, spraying, knife-coating, roller-coating, or other conventional means and is then covered with a sheet of steel, glass, cellophane or other material adapted to exclude air and is then cured in the absence of air. The layer of resin thus applied and cured fills up irregularities in the surface of the base material and provides a smooth surface coating.

Two glass reinforced unsaturated polyester sheets, or the mating surfaces of two glass reinforced unsaturated polyester articles, may be adhered together without sanding or abrading the surfaces thereof by utilizing similar processes. The unsaturated polyester articles are prepared by subjecting the articles to curing conditions with one surface of the articles exposed to air. An unsaturated polyester resin is then applied to the air exposed surface of one of the articles and the air exposed surface of the second article is placed atop the unsaturated polyester resin. The resulting assembly is then subjected to curing conditions in the absence of air.

The process utilizes as the resin-forming compound unsaturated polyester resins. Unsaturated polyester resins are a class of thermosetting synthetic resins preferably produced by the esterification of polybasic organic acids with polyhydric alcohols. Generally the unsaturated polyester resin cures by the cross linkage of a compound such as styrene, with the polyester at the carbon-carbon double bond and in many cases at low temperatures, and in the absence of air.

For most purposes, the resins should be used in admixture with polymerization catalyst. Typical polymerization catalysts are benzoyl peroxide, acetyl peroxide, benzoyl acetyl peroxide, lauroyl peroxide, dibutyryl peroxide, succinyl peroxide, sodium peroxide, barium peroxide, tertiary alkyl hydroperoxides such as tertiary butyl hydroperoxide (often called simply tertiary butyl peroxide), di-(tertiary alkyl) peroxides such as di-(tertiary) butyl peroxide, peracetic acid, perborates, persulfates, etc. In some cases metals and metallic salts may be used as polymerization catalysts. If desired, mixtures of polymerization catalysts may be used. In some cases it may be desirable to conduct the polymerization in the concurrent presence of both a catalyst and an inhibitor of polymerization. Amounts of peroxide catalyst between about 0.01% and about 5% by weight of the polymerizable unsaturated compound or compounds are usually satisfactory, although the amount is not necessarily limited to this range.

Figure 2:
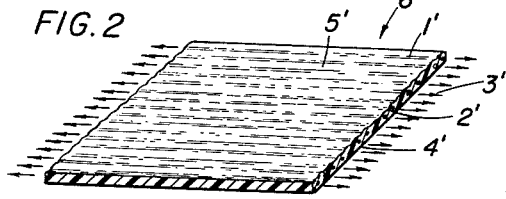
FIGURE 2 is a perspective view of another such sheet wherein the glass strands are substantially at 90° to those in the sheet of FIGURE 1.

In FIGURES 1 and 2 glass yarn strands 1 and 1' are maintained under tension as illustrated by the arrows indicated generally at 3 and 3' respectively while the unsaturated polyester resin 2 and 2' is cured to provide a smooth surface 4 and 4' and a rough surface 5 and 5' on articles indicated generally as 6 and 6' respectively. Surfaces 5 and 5', in addition to being rough, are air inhibited. The production of sheets 6 and 6' may be accomplished by disposing strands 1 and 1' adjacent a sheet of cellophane or like non-bibulous material, maintaining the strands under tension, impregnating the strands with the unsaturated polyester synthetic resin, and applying heat either in an oven or from infrared lamps or from any other suitable means in order to cure the unsaturated polyester while surfaces 5 and 5' are maintained devoid of any means which would prevent access of air thereto.

A sheet of cured unsaturated polyester synthetic resin reinforced with a single layer of straightened continuous glass strands extending parallel to one another, such as sheet 6 or sheet 6', may also be provided by passing a warp of glass yarn through a device as shown in FIGURE 13 or through any other machine adapted to impregnate a warp 75 with polymerizable synthetic resin 56 and to subsequently polymerize the resin while the strands are maintained under longitudinal tension by means of a windup roll 85 at the tail end of the machine acting against a feed roll 74 at the front end of the machine which is subjected to braking action (not shown).

A sheet of cellophane 76 or like non-bibulous material may be brought into contact with the warp at a point where it has left impregnating tank 71 but has not yet entered a polymerizing zone or a space such as oven 80 for example over one roll 77 of a pair of combining rolls 77 and 78 (roll 78 being disengaged) and the impregnated warp 75' may be cured in contact with such cellophane sheet on one side only in order to provide unidirectionally reinforced sheet 6 or 6', having a rough air-inhibited surface on one side and a smooth surface which was uninhibited by the presence of air on the other.

Figure 3:
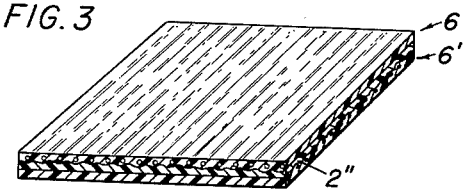
FIGURE 3 is a perspective view of the sheets of FIGURES 1 and 2 disposed adjacent one another with the unsaturated polyester synthetic resin thereinbetween.
Figure 4:
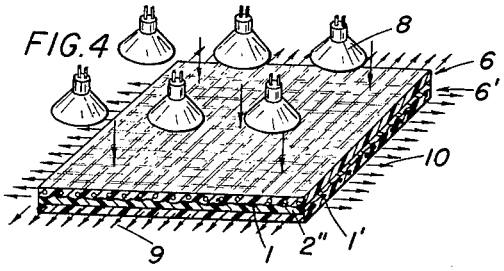
FIGURES 4 and 5 are similar perspective views illustrating further steps in the process.
Figure 5:
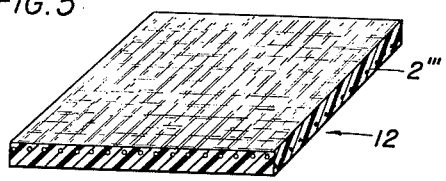

As shown in FIGURE 3, sheets 6 and 6' may be then disposed adjacent one another with a layer of unsaturated polyester synthetic resin 2" thereinbetween. As shown in FIGURE 4, heat may then be applied thereto as from lamps 8 while tension is maintained upon the strands 1 and 1', with the concomitant results of maintaining the strands in a straightened condition, in sheets 6 and 6' as indicated by arrows 9 and 10 respectively. The article indicated generally as 12 in FIGURE 5 may thus be provided, comprising a single body of cured cross-linked unsaturated polyester synthetic resin 2'" provided with two layers of reinforcing strands therein, each of the layers being planar, the planes of the two layers being substantially parallel and the strands in each layer being substantially parallel.

Figure 6:
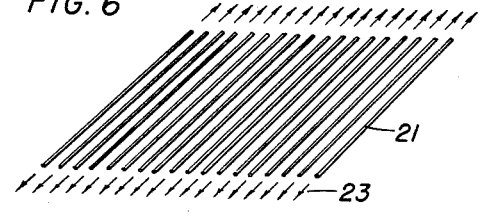
FIGURE 6 is a perspective view of a plurality of straightened glass strands maintained parallel to one another in a planar layer.
Figure 7:
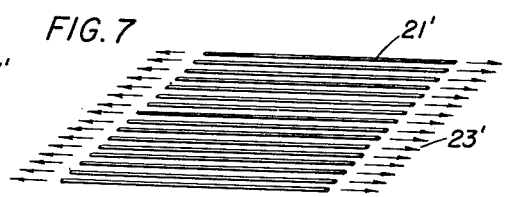
FIGURE 7 is a view of a similar group of strands oriented at 90° to those of FIGURE 6.

As shown in FIGURES 6 and 7, two groups of strands 21 and 21' respectively may be arranged so that the strands in each group are parallel to one another as well as straight and are disposed within a plane and the planes of the two groups are parallel, the strands being maintained under tension as indicated by arrows 23 and 23'.

Figure 8:
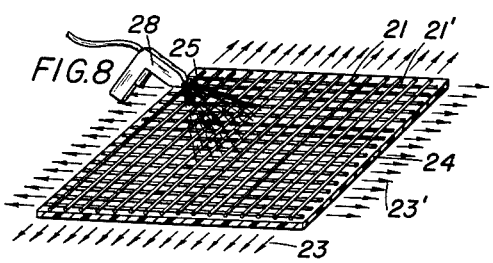
FIGURE 8 is a perspective view of the strands of FIGURES 6 and 7 disposed adjacent one another showing a further step in the process.
Figure 9:
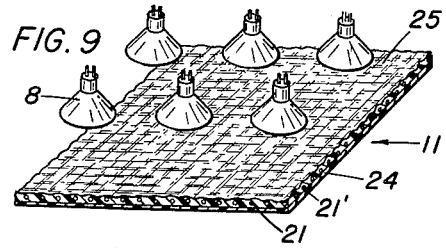
FIGURES 9, 10 and 11 are similar perspective views showing further steps in the process.

As shown in FIGURES 8 and 9 these straightened strands may be disposed adjacent one another and also adjacent a sheet of cellophane 24 and may then be impregnated with viscous polyester synthetic resin 25 by spraying from a spray gun 28. We may then apply heat thereto as from lamps 8 to provide article 11 comprising glass strands 21 and 21' embedded in cured unsaturated polyester resin 25 and having a very rough upper surface.

Figure 10:
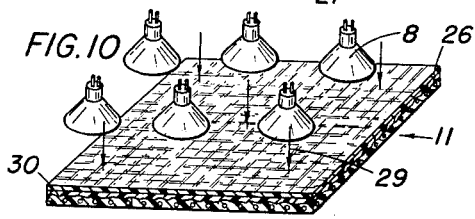
Figure 11:
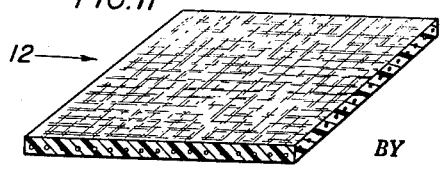

The bottom cellophane sheet 24 may be stripped therefrom, additional unsaturated polyester resin 30 may be applied thereto, and as shown in FIGURE 10 pressure may be applied as indicated by arrows 29 and heat may be applied as from lamps 8 to cure the upper layer. As a result of the upper surface of article 11 being cured in the presence of air, a bond is obtained which after curing of the unsaturated polyester 30 is so great as to cause all of the unsaturated polyester resin in the article to become a single body and thus article 12 as illustrated in FIGURE 11 is provided.

Referring now to FIGURE 12 there is shown apparatus for carrying out the process on a continuous basis. Cylinder 40 may be adapted to serve as a mandrel and may be mounted horizontally or vertically, as shown, on supporting block 41. Roll 42 of cellophane 43 may be disposed near the bottom of the apparatus. In place of cellophane there may be used any non-bibulous web such as for example a web of polyvinyl alcohol film, polyvinyl acetate film, polyvinyl chloride film, polyvinylidene chloride film, polyethylene terephthalate or the like.

Cellophane guide 44 may be disposed around mandrel 40 in such manner as to cause the web of cellophane 43 to assume a cylindrical shape disposed against the outer cylindrical surface of mandrel 40. Winder rings 45 and 46 may be arranged to rotate in a horizontal plane with the axis of mandrel 40 as their axis and may be driven by motor 47 through gears 48 in such manner that rings 45 and 46 are caused to rotate in opposite directions as shown by arrows 49 and 50. Each of rings 45 and 46 may carry with it a plurality of spools of yarn such as spools 51 and 52 in a manner described in greater detail in the abandoned applications Serial No. 334,592, filed February 2, 1953, Serial No. 361,992, filed June 16, 1953, and Serial No. 378,083, filed September 2, 1953. By means hereinafter described cellophane 43 is caused to travel continually upward and while rings 45 and 46 rotate, strands 53 and 54 are pulled from spools 51 and 52 and are wrapped around cellophane 43. They provide two layers of parallel crossing strands as shown at 55. The unsaturated polyester resin may be applied to impregnate the strands by spraying resin 56 from spray nozzles 57 and the unsaturated polyester resin may be cured by any suitable means such as by causing the mandrel to extend through an oven or by means of infrared lamps 58. The article thus provided may be slit into one or more strips, for example two strips 60 and 61, by slitters 59. These strips may pass over idler or direction-changing rolls 62 and 63 and thence to wind-up or storage rolls 64 and 65. In order to pull the cellophane 43 web upwards the rolls 64 and 65 may be suitably driven as by an electric motor through suitable chain-drives or gearing, such driving means being well known in the art and for the sake of simplicity not being illustrated. The sheets as rolled on rolls 64 and 65 may then be taken to conventional coating or laminating apparatus and in accordance with the process illustrated in FIGURE 10 may be coated on their rough air-inhibited sides with the unsaturated polyester resin, provided with webs of cellophane adjacent such coated surfaces, then cured in ovens or under infrared lamps and finally rolled on final wind-up or storage rolls.

The following examples serve to illustrate the invention:

*Example 1*

Twisted glass yarn, designated 450½, was wound around each of two 6" x 12" x ¼" tempered glass plates with a spacing of .0192 inch on centers, the plates having first been covered with cellophane. The single layer of parallel strands on one side of each of the plates was impregnated with the following resin mixture:

50 grams flexible unsaturated polyester resin (Selectron 5208) (sold commercially by Pittsburgh Plate Glass Co.)
150 grams rigid unsaturated polyester resin (Selectron 5000) (sold commercially by Pittsburgh Plate Glass Co.)
4 grams benzoyl peroxide catalyst (Luperco ATC).

The resin on each of the plates was cured at 120° C. for twenty minutes with only one surface of each of the plates being opened to the atmosphere.

The plates were removed and an additional amount of the same resin mixture was applied to one of the resin impregnated surfaces. The two plates were superimposed with the fibers in one perpendicular to those in the other to provide an assembly comprising two layers of parallel glass strands, each imbedded in cured unsaturated polyester resin, with uncured resin in between. Slight pressure was applied to the two plates and they were replaced in the oven and were again cured for twenty minutes in the absence of air. Excellent adhesion was obtained.

*Example 2*

Glass cloth designated 116 is impregnated with a resin mixture comprising:

200 grams flexible unsaturated polyester synthetic resin (Laminac 4128)
200 grams rigid unsaturated polyester synthetic resin (Laminac 4134)
8 grams benzoyl peroxide catalyst (Luperco ATC)

Laminac resin is a propylene glycol, fumaric acid, phthalic anhydride polyester with styrene as a crosslinking agent.

The impregnated swatch of cloth is laid on a sheet of cellophane and cured for twenty to forty minutes at about 200° to 225° F. A similarly impregnated and cured sheet may be adhered to the first such impregnated and cured sheet with a quantity of the same resin as an adhesive. The adhesive may be cured under the same conditions, it being essential that the unsaturated polyester synthetic resin in each of the sheets to be adhered together be cured with the surfaces to be adhered open to the air.

*Example 3*

Blocks each 4" x 4" x ½" are prepared by impregnating a plurality of layers of 181 glass cloth with the unsaturated polyester resin mixture and curing at 180° F. for 20 minutes and then at 230° F. for 20 minutes, with the upper surface of each block being allowed to remain open to the atmosphere while curing. An additional quantity of the same resin mixture is placed on top of one of these surfaces and the other is pressed against it. The assembly is then subjected to a temperature of 220° F. for 45 minutes to cure the bonding resin. The completed article is subjected to tensile and flexure tests and it is found that delamination does not occur more readily at the bonded joint than elsewhere in the article.

Thus it may be seen that although our invention is useful and desirable for laminating together single sheets of glass fabric or single sheets of unidirectionally reinforced polyester synthetic resin, it is also useful in providing excellent bonding between two polyester articles of any sort if the polyester at the surfaces to be bonded can be cured in the presence of air. For example, sections of pipe can be bonded to pipe couplings.

This invention represents an improvement on the invention disclosed in the above mentioned copending application Serial No. 317,072, filed October 27, 1952.

It is thus apparent that our invention is broad in scope and is to be limited only by the claims.

Having thus disclosed our invention, we claim:

1. The method of making a polyester article devoid of any identifiable bond lines comprising the steps of subjecting to curing conditions an article comprising an unsaturated polyester synthetic resin normally adapted to require curing in the absence of air, and reinforced with glass fibers which are straightened and parallel, while exposing one surface of the article to the presence of air, then disposing against the air exposed surface a second layer of uncured, unsaturated polyester resin normally adapted to require curing in the absence of air, subjecting to curing conditions a second article comprising an unsaturated polyester synthetic resin normally adapted to require curing in the absence of air, while exposing one surface of the second article to the presence of air, then disposing against the second layer of uncured resin the exposed surface of the second article, subjecting the resulting assembly to curing conditions in the absence of air to cure the assembly of the unsaturated polyester synthetic resin.

2. The method claim 1, in which the first article is reinforced with a web of two layers of glass fibers in juxtaposition so that one layer is at right angles to the other.

References Cited in the file of this patent
UNITED STATES PATENTS

| | | |
|---|---|---|
| 2,628,178 | Burnett | Feb. 10, 1953 |
| 2,642,920 | Simon | July 23, 1953 |
| 2,781,287 | Gustus et al. | Feb. 12, 1957 |

FOREIGN PATENTS

| | | |
|---|---|---|
| 449,223 | Great Britain | June 23, 1936 |
| 627,255 | Great Britain | Aug. 4, 1949 |

OTHER REFERENCES

Modern Plastic, March 1950, pp. 111–114, 116, 188, 120 and 172.

Plastics Catalog, Glass Fabric Laminates, 1944, pp. 770, 772–774.

"Glass Fibre Laminates in Cartography," article by E. W. Jackson, published in "British Plastics," June 1950, pages 272–280.